United States Patent [19]
Artman

[11] 4,446,831
[45] May 8, 1984

[54] PRECOMBUSTION CHAMBER FOR INTERNAL COMBUSTION ENGINE

[76] Inventor: Noel G. Artman, 15830 Nicklaus La., Sun City, Ariz. 85351

[21] Appl. No.: 366,446

[22] Filed: Apr. 7, 1982

[51] Int. Cl.³ ............................................. F02B 3/00
[52] U.S. Cl. .................... 123/286; 123/281; 123/275; 123/263
[58] Field of Search ............... 123/258, 262, 263, 274, 123/280, 281, 286, 289

[56] References Cited

U.S. PATENT DOCUMENTS

| | | | |
|---|---|---|---|
| 2,223,090 | 11/1940 | Boxan | 123/33 |
| 2,595,914 | 5/1952 | Barber | 123/295 |
| 2,760,467 | 8/1956 | August | 123/263 |
| 2,884,913 | 5/1959 | Heintz | 123/28 |
| 3,102,521 | 9/1963 | Slemmons | 123/32 |
| 3,304,922 | 2/1967 | Hideg | 123/279 |
| 3,315,650 | 4/1967 | Bishop et al. | 123/279 |
| 3,439,656 | 4/1969 | Hideg | 123/279 |
| 3,696,798 | 10/1972 | Bishop et al. | 123/279 |
| 4,203,393 | 5/1980 | Giardini | 123/279 |
| 4,213,435 | 7/1980 | Simko | 123/279 |
| 4,240,395 | 12/1980 | Simko et al. | 123/279 |
| 4,320,727 | 3/1982 | Artman . | |
| 4,320,728 | 3/1982 | Artman . | |
| 4,364,342 | 12/1982 | Asik | 123/279 |

FOREIGN PATENT DOCUMENTS 2715943 10/1978 Fed. Rep. of Germany .... 123/32 C

OTHER PUBLICATIONS

"Auto Engines of Tomorrow", Edward Dark, Indiana U. Press, 1975, pp. 144–152.
"Automotive Industries Magazine", Oct., 1979, pp. 87, 90, 91.
"Automotive Industries Magazine", Jan. 1980, pp. 44, 45.
"Stratified Charge Engine", Pop. Science, 11/81, pp. 82, 83.

*Primary Examiner*—Ronald B. Cox

[57] ABSTRACT

A spark-ignition type internal combustion engine having a precombustion chamber auxiliary to the variable volume space in the engine cylinder between the piston and cylinder head. Fuel injected into air in the chamber and fuel-laden air initially entering this chamber from the variable volume space, pursuant to the compression stroke of the piston, form a mixture compressed into a discrete reliably spark-ignitable air-fuel mass within a portion of the chamber where such mass envelops igniter electrodes. A vestibule portion of the chamber causes air, or air mixed with fuel in quantity determinative of engine power output, forced from said space to enter the chamber in a manner compressing and retaining the air-fuel mass in its enveloping relation with the electrodes until ignition occurs.

15 Claims, 9 Drawing Figures

PRECOMBUSTION CHAMBER FOR INTERNAL COMBUSTION ENGINE

SUMMARY OF THE INVENTION

This invention relates to internal combustion engines of the type wherein combustion is initiated in a combustion chamber auxiliary to and communicative with a variable volume space generally corresponding to what is commonly termed the combustion chamber of an orthodox Otto or four-stroke-cycle engine. The invention particularly concerns improvements in the construction and arrangement of parts of the auxiliary chamber (commonly and herein termed precombustion chamber) that control the flow of air from the variable volume space into and within the chamber. This control is in a manner that causes rotation of the chamber-contained air about an axis of such chamber and arrangement of such rotating air into discrete rotating masses occupying respective adjacent positions along said axis. This control of the air makes it possible to mix fuel with one of these masses exclusively of or in greater amount than in the other to create with the one mass an ideal spark-ignitable air-fuel mixture, whereby ensuing combustion occurs more completely in an excess of oxygen existing in the other air mass and with less fuel to produce a given amount of energy under engine idle and part load conditions than if all of the air had received enough fuel to dependably spark-ignite. In this manner the invention provides for not only an improved fuel comsumption characteristic but also for diminution of exhaust gas pollutants. Both air masses are mixable with combustion-sustaining quantities of fuel varying in amount to attain desired engine speed and power.

The species of structure herein disclosed are improvements upon that disclosed in my U.S. Pat. No. 4,320,737 titled Process of Fuel Stratification Within and Venting of Engine Auxiliary Combustion Chamber, and No. 4,320,728 titled Engine Precombustion Chamber with Provisions for Venting Thereof and Fuel Stratification Therein. Details of these improvements and their distinction from the species disclosed in said patents will become apparent from the ensuing description with reference to the appended drawing.

DESCRIPTION OF DRAWING FIGURES

DESCRIPTION AND EXPLANATION OF THE ILLUSTRATED FORMS OF THE INVENTION

Figure 1:
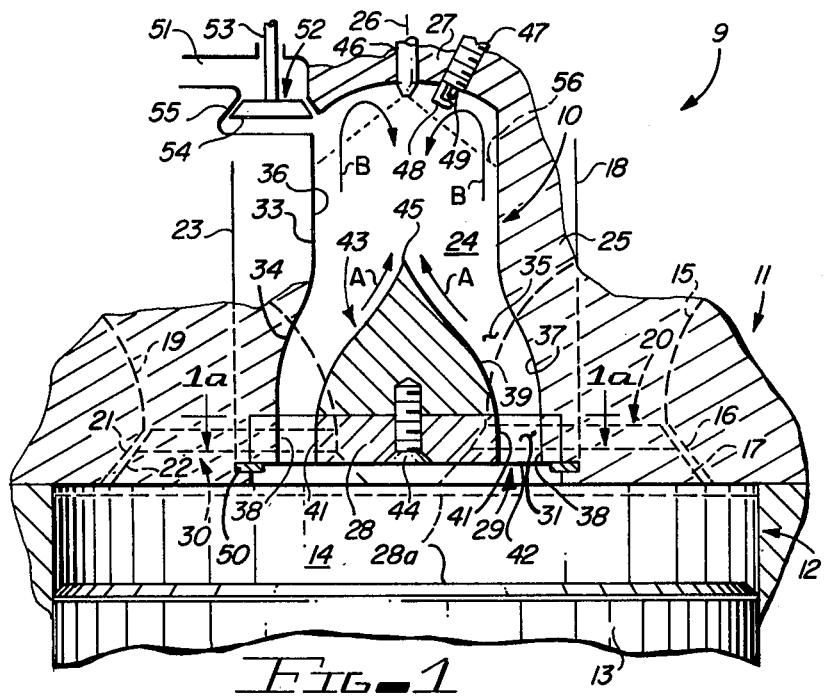
FIG. 1 is a fragmentary partially diagramatic sectional view taken of a preferred form of the improved precombustion chamber structure shown in association with an internal combustion engine cylinder and piston.

A precombustion chamber structure 10 constituting a preferred form of this invention is shown in FIG. 1 in the cylinder head 11 of a cylinder 12 which are parts of a 4-stroke cycle internal combustion engine 9. A piston 13 reciprocates conventionally in the cylinder to vary the volume of a variable volume space 14 in the cylinder between the piston and the cylinder head. The cylinder head contains an air intake passage 15, shown in dotted lines, communicating with the cylinder variable volume space 14 through an intake valve seat 16 when the head 17 of diagramatically shown intake valve 20 is unseated by a thrust force exerted through valve stem 18. Also contained in the cylinder head is an exhaust passage 19 communicative with the variable volume space through the seat 21 of a diagramatically shown exhaust valve 30 when its head 22 is unseated by a thrust force exerted through a valve stem 23.

The chamber structure 10 includes for enclosing the chamber 24 thereof a sidewall 25 generated circularly about a principal axis 26 and opposite endwalls 27 and 28 spaced apart axially of the chamber. Chamber 24 in volume can be approximately 1/7th of the maximum volume of the variable volume space 14 which occurs when the piston 13 is in its lowermost position. This would provide a typical compression ratio of 8 to 1. The uppermost position of piston 13 occurs when its crown 28a reaches the dotted line position which entails minimal clearance relatively to the cylinder head 11 so that at the end of the compression stroke a very high percentage of the compressed gaseous content will occupy the combustion chamber 24. Endwall 28, which is held in position by a snap ring 50, includes passage means 29 having a passage 31 annular in transverse section surrounding the axis 26 and communicating between the variable volume space 14 and the interior of chamber 24. This passage 31 is operable to conduct air and particles mixed therewith, as later explained, from space 14 into the chamber 24 pursuant to a compression stroke (upward as viewed in FIG. 1) of piston 13. Chamber 24 is composed of a principal portion 33 and a vestibule portion 34 comprising an elongated duct 35 annular in transverse section surrounding the axis 26. Said duct communicates at one end (upper end as viewed in FIG. 1) with the principal chamber portion 33 and includes at its other end the annular passage 31, causing this duct to extend endwise into communication with the space 14 and be operable to receive air and its contained particles from this space and to conduct at least a portion of such received air into the principal chamber portion pursuant to a compression stroke of piston 13.

The chamber sidewall 25 has an inwardly facing periphery 36 of the chamber principal portion 33 and an inwardly facing outer periphery 37 of the annular duct 35 of the chamber vestibule portion. Outer periphery 38 of passage 31 of passage means 29 constitutes an extension part of duct periphery 37. The elongated annular duct 35 has an inner periphery 39 facing outwardly in opposed spaced relation to the outer periphery 37. Inner periphery 41 of passage 31 constitutes an extension part of duct periphery 39. The annular passage 31 constituting a transverse section of the annular duct 35 contains and comprises a plurality of air deflecting vanes 42 spaced apart circumferentially of the chamber axis and angularly tilted in the same direction hellically thereabout. These vanes of the annular passage means 29 impart to the air conducted thereby from the variable volume space 14 a spiral motion about the axis 26, whereby due to confinement of the conducted air by the chamber sidewall, such air flows axially upwardly in the form of a vortex within the vestibule annular duct 35. Thus the passage means 29 and the chamber sidewall 25 are configured to cooperatively create of the conducted air a vortex encircling the axis 26 within the chamber 24 adjacently to its endwall 28.

Vortex flow control means 43 in the form of a cone-like structure disposed contiguously with the chamber endwall 28 and secured thereto by a screw 44 provides as part thereof a portion of the cone-like periphery 39 of the elongated annular duct 35, the remaining portion of such periphery being provided by the inner periphery 41 of passage 31. The term "cone-like" is used advisedly herein to include within its scope, contour, profile and periphery shapes related to but not of a strictly classical cone of which the surface elements which converge from the cone base to its apex conform to straight lines. Such related shapes include those of a variety of domes as that of the structure 43 as well as that of a classical cone, and which would function in a manner making use of the principals involved in this invention. That part of the periphery 39 constituting a surface portion of vortex flow control means 43 extends from the one endwall 28 toward the other endwall 27 and transverse sections of this cone-like periphery diminish in perimeter as a positive or direct function of their respective distance from the one endwall. Radially inner and outer surface portions of the annular column or vortex of air (in tubular columnar form) rotating within the annular (in transverse section) vestibule duct 35 about the chamber axis tend to follow respectively the peripheries 39 and 37. This is a phenomenon known as the Coanda effect which is defined in the Third Edition of Van Nostrand's Scientific Encyclopedia as follows: "The tendency of a jet of gas to follow the wall contour when discharged adjacent to a surface even when that surface curves away from the jet discharge axis is known as the Coanda effect". Because of this tendency of the radially inner portion of the vortex to follow the cone-like periphery 39 of the vortex flow control means 43, such periphery conduces convergence of at least a portion of the axially advancing vortex radially toward the axis 26. In this manner the vortex flow control means 43 causes a central core-like portion of the vortex to thrust spirally upwardly from the apex 45 in opposition to and with somewhat neutralizing effect upon a reflux vortex thrust downwardly from the chamber endwall 27 along and closely around the chamber axis. The position and upward thrust of the core-like portion of the vortex are illustrated by the arrows A whereas the position and downward thrust of the reflux vortex are illustrated by the arrows B. The reflux vortex is created by air introduced into the principal chamber portion 33 by a part of the vortex entering such principal chamber portion advancing spirally upwardly contiguously with the inwardly facing periphery 36 thereof and upon reaching the chamber endwall 27 being deflected thereby downwardly contiguously about the chamber axis as explained in German Pat. No. 2715943 issued to Robert Bosch GmbH.

Because of this vortex flow control, downward movement of all parts of air initially in the chamber portion 33 and that of the vortex entering this chamber portion is effectively opposed by vortex air succeedingly flowing into this chamber portion, wherefore the air initially in this chamber portion with fuel mixed therein, as later described, is compressed into a space of less volume adjacently to the chamber upper endwall. Successively later entering portions of the vortex are compressed into respective lower portions of chamber portion 33. Due to the kinetic character of this entire fluidal mass consisting of axially-adjacent portions respectively of air and of an air-fuel mixture rotating about the chamber axis, there will be some errant parts of these adjacent portions that migrate axially into the other of such portions, wherefore no cleavage-plane-like division will exist between these portions, although they will transiently endure as discrete portions of said mass. It should be noted too, that none of the air or air-fuel mixture delivered upwardly past the apex 45 can flow back into that part of the vortex advancing upwardly in vestibule duct 35.

The chamber upper endwall 27 has centrally mounted therein a fuel injector 46 for injecting into the chamber a fuel such as gasoline or equivalent evaporative fuel adapted for spark ignition by an electric spark igniter 47 when mixed with air in proper amount. Igniting spark occurs between electrodes 48 and 49.

Air can enter the upper part of chamber 24 through an air inlet passage 51 past an air intake poppet valve 52 when it is opened by a downward thrust through valve stem 53 to unseat from a valve seat 55 a valve head 54 conventionally urged onto such seat by a spring, not shown. This valve 52, the intake and exhaust valves 20 and 30 respectively in the air intake and exhaust passages 15 and 19, the fuel injector 46 and the spark igniter 47 may be conventionally operated in timed sequence with movement of piston 13 which drives the engine crankshaft, not shown.

Operation of the engine parts thus far described is as follows: Starting with the downward air-intake stroke of piston 13 of this 4-stroke cycle engine, air is drawn into the variable volume space 14 through the then open intake valve 20. Exhaust valve 30 is closed at this time, but air inlet poppet valve 52 is open during a sufficient part of the intake stroke to admit into combustion chamber 24 enough air to replace and discharge at least a substantial part of the products of the previous combustion through the annular duct 35 into the variable volume space 14. During the ensuing compression stroke of piston 13 the exhaust valve and both air intake valves are closed. Air in the contracting variable volume space is forced from this space past the air deflecting vanes 42 into the combustion chamber 24. As this air passes the vanes it is deflected thereby to flow helically through the vestibule duct 35 in the form of a vortex spinning about the chamber axis 26. As successive transverse sections of this upwardly advancing vortex reach the apex 45 of the vortex flow control means 43 they become solid or disc-like in contrast to annular and become part of a fluidal mass rotating about the chamber axis. This rotating mass is compressed and forced upwardly in the principal chamber portion 33 by the upwardly advancing vortex in the vestibule duct 35 until completion of the piston compression stroke.

Fuel injection may occur during the air intake stroke and for a short time into the compression stroke. Fuel delivery through the injector is assumed to be at a constant rate than at full load operation. To attain full load operation, fuel injection may start at a predetermined time near start of the intake stroke. During this intake stroke the variable volume space 14 will be charged with air entering past intake valve 20 supplemented by air entering past inlet valve 52 and by way of combustion chamber 24 from which such air forces products of the preceding combustion into said space. The fuel which is injected in the form of a conical spray pattern such as 56 into the chamber will mix with and be borne by the air moving through the chamber into the variable volume space where it also mixes with air therein and with the combustion products forced from the combustion chamber. The fuel delivery rate will be such that upon completion of the intake stroke the variable volume space will have been charged with an amount of fuel which, when later supplemented in the combustion chamber by fuel contained in such chamber prior to ignition, will produce maximum power for which the engine is rated. This amount of fuel in the variable volume space and the air mixed therewith, when compressed into the combustion chamber pursuant to the ensuing compression stroke, will constitute an air-fuel mixture sufficiently rich in fuel to support combustion.

Engine operation at selectable part loads is accomplished by starting fuel injection at later times during the intake stroke than at full load operation, thus incurring injection periods of selective duration correlated with respectively different amounts of injected fuel and power output. With this mode of operation, irrespective of engine load magnitude, fuel injection started before termination of the air intake stroke will continue until start or even after start of the ensuing compression stroke to assure the presence of fuel in the combustion chamber at the start of compression. During the compression stroke when all of valves 20, 30 and 52 are closed, air initially in the combustion chamber 24 mixes with fuel contained therein and any injected thereinto following termination of the preceding intake stroke. This mixture will be that initally compressed upwardly to form the reliably spark-ignitable air-fuel mass enveloping the electrodes 48 and 49. Ignition will occur at or near termination of the compression stroke.

Now considering what occurs during engine operation under the condition of no-load at idling speed, adequate fuel may be provided by injection starting at or near start of the compression stroke. Injection may continue after intake stroke termination and into the compression stroke cycle long enough to ensure there being in the chamber an amount of fuel which when mixed with the chamber-contained air will provide therewith an air-fuel mixture sufficiently rich in fuel to be reliably spark-ignitable. This is significant because, as explained above, it is this mixture which is initially compressed upwardly in the chamber to form the spark-ignitable air-fuel mass enveloping the electrodes. At no time during the compression stroke will there be a significant amount of fuel in the variable volume space, wherefore the gaseous vortex advancing spirally upwardly in and through the vestibule annular duct 35 will be composed principally of air, containing combustion products for recycling, forced upwardly from said space. This vortex rotates and compresses the spark-ignitable air-fuel mixture upwardly in the form of a rotating mass enveloping electrodes 48 and 49 where the bulk of such mass remains until ignited. The energy obtained from burning this amount of fuel will be adequate to support no-load idle speed engine operation. At the time of ignition, that part of the chamber content below said air-fuel mass will consist principally of compressed air providing an excess of oxygen for efficient burning of the fuel particles, thus minimizing exhaust gas pollutants.

This process of forming, in the precombustion chamber, a body comprised of a mass of combustible air-fuel mixture and an adjoining mass of air which contains, at most, less fuel per unit of air than is in the combustible air-fuel mixture, involves the air first entering the chamber and passing therethrough into the variable volume space and the air subsequently and last entering the chamber in such quantity as to occupy and remain therein upon completion of the engine intake stroke and expansion of the variable volume space. Said first entering air may be regarded as being a leading air portion and the air remaining in the chamber upon termination of said space expansion may regarded as the trailing portion of air introduced into the chamber. Fuel is introduced into the chamber in such quantity and timed relation with the expansion and ensuing contraction of said space as to coexist in said chamber with said trailing air portion to form therewith the air-fuel mixture. When the engine is to operate under slow speed idle or very light load conditions, very little or no fuel will have been introduced into the chamber for or with the leading air portion. During the ensuing contraction of the variable volume space, air is forced from this space and directed into the chamber where it is shaped or confined by the vestibule 34 in tubular columnar form extending lengthwise of and encircling the axis 26 from which such form is internally transversely spaced adjacently to the chamber endwall 28 and internally axially tapered to advance convergingly toward the axis at a position thereon (adjacent apex 45) nearer to the upper end of the chamber. The upwardly advancing transverse sections of the tubular column successively ariving at the apex 45 become disc-like in contrast to annular and, as above described, compress the air-fuel mixture into a concentrated mass adjacently to the upper end of the principal chamber portion 33 attendant to establishing the columnar form as at least part of the adjoining air mass within the chamber.

Engine operation during the compression stroke under partial and full load conditions differs from operation under no-load idle speed conditions, just described, only in the respect that at the beginning of the compression stroke the variable volume space will contain significant amounts of fuel mixed with the air therein respectively in proportion to the amounts of power to be developed. As in the case of no-load idle speed operation, fuel injection may stop when the combustion chamber has received an amount of fuel which, when mixed and compressed with the trailing portion of air then in the chamber, will provide with such air an air-fuel mixture that is reliably spark-ignitable. As the compression stroke continues, fuel-laden air is forced from said space into the vestibule duct 35 where this fuel-laden air spirals upwardly in the form of said vortex to compress and position said reliably spark-ignitable mixture upwardly to form the spark-ignitable mass enveloping the electrodes. At the instant spark ignition occurs near completion of the compression stroke, that part of the chamber contents below the spark-ignitable mass during this part load operation will be relatively lean with fuel, so as in the case of no-load idle speed operation, there will be an excess of oxygen for efficient burning of fuel particles.

Segregation, in a combustion chamber, of an air-fuel mixture mass relatively to a principally-air mass containing less or no fuel is popularly termed "stratification". However, because of the kinetic character of these two fluidal masses, as explained above, in practice, there is no thin cleavage-plane-like juncture between these masses nevertheless efficient combustion occurs so long as a reliably spark-ignitable portion of the air-fuel mass envelops the igniter electrodes for ignition thereby to establish a flame front to reach all fuel particles. This flame front of burning fuel advances spherically from the electrodes, increasing the temperature and pressure in the combustion chamber and thus forcing the resulting hot gases through the vestibule duct 35 into the variable volume space to force the piston downwardly in effecting the power stroke.

The preceding description of engine operation involving the intake, compression and power strokes, assumed a constant fuel delivery rate, per degree of engine crankshaft rotation through the injector so the quantity of fuel delivered per injection is proportional to length of the injection period in terms of degrees of crankshaft rotation, and described conditions which occur and develop when the injection period length is changed by changing its starting time during the stroke or cycle wherein such starting occurs. Alternately, the injection period time length can be changed by changing its termination time or by changing both start and termination times of such period to vary the quantity of delivered fuel and engine power output.

During the exhaust stroke of piston 13 that immediately follows the power stroke, only the exhaust valve 30 will be open. Products of combustion will be exhausted from the variable volume space past such exhaust valve and eventually to the atmosphere. Those combustion products in chamber 24 will remain there during the exhaust stroke. This is an operating characteristic that improves exhaust emissions control. The combustion products retained in this chamber amount to about ⅛th of the total, ⅞ths having been exhausted past the exhaust valve. However, as explained above, during the ensuing air intake stroke, in addition to the intake valve 20 being open, the inlet valve 52 opens, permitting air to enter the upper portion of the combustion chamber to replace and force the residue combustion products downwardly from this chamber into the variable volume space 14. Fuel injected into this replacement air near completion of the intake stroke and the beginning of the compression stroke is, during the ensuing compression stroke in the manner above described, compressed with this air to form the spark-ignitable air-fuel mass enveloping the electrodes. No significant amount of combustion products are present to dilute this spark-ignitable mass because, during the air intake stroke, the residue combustion products were swept from the combustion chamber into the variable volume space and replaced by air entering this chamber past the inlet valve 52. During the ensuing compression stroke these residue combustion products are transported within the air forced from the variable volume space through and into the vestibule duct 35 to form the lower mass in the combustion chamber preparatory to ignition. Pursuant to combustion that follows this ignition, these transported combustion products are again subjected to a combustion flame front, heat and pressure which causes at least part of the hydrocarbons and carbon monoxide thereof to oxidize, burn, and thus utilize their latent energy and avoid their exhaust in the form of atmospheric pollutants.

Figure 1A:
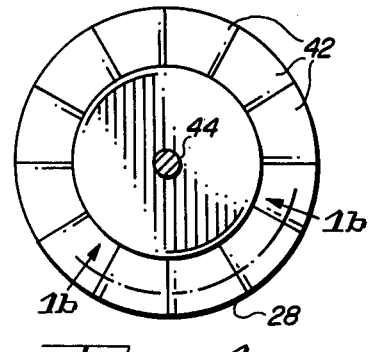
FIG. 1a is a view taken on the line 1a—1a of FIG. 1 illustrating air deflecting vanes in an annular passage in an endwall of the chamber structure.
Figure 1B:
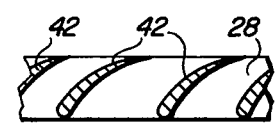
FIG. 1b is a fragmentary panoramic view taken at the line 1b—1b of FIG. 1a sectionally through several air deflecting vanes.
Figure 2:
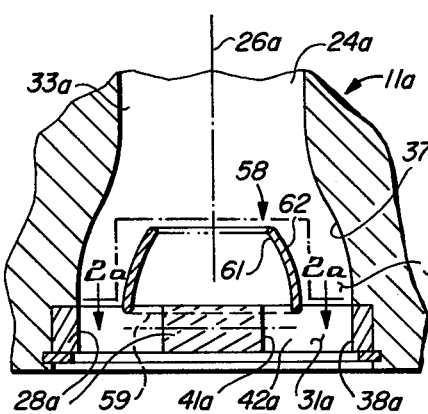
FIG. 2 is a fragmentary sectional view of a second form of improved precombustion chamber structure.
Figure 2A:
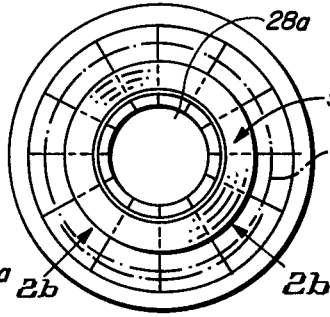
FIG. 2a is a view taken on the line 2a—2a of FIG. 2 illustrating air deflecting vanes and a concavo-convex vortex flow control structure associated with an annular passage through an endwall of the chamber structure.
Figure 2B:
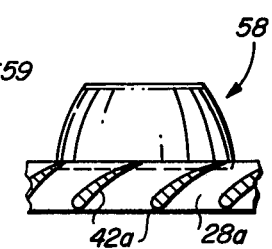
FIG. 2b is a fragmentary panoramic view taken at the line 2b—2b of FIG. 2a sectionally through several air deflecting vanes.

The second form of the invention, illustrated in FIGS. 2, 2a and 2b, operates in the same environment as the corresponding parts in the FIGS. 1, 1a and 1b form. Parts in this second form that correspond to parts in the first form are designated by the same respective reference characters plus the suffix letter "a" as an expecient to avoid repetitive description. In this second invention form a vortex flow control means or hollow truncated dome structure 58 replaces the dome or cone-like vortex flow control means 43 of FIG. 1. The base of structure 58 is welded to the air deflecting vanes 42a in axial congruent registry with a line 59 encircling the chamber axis 26a in a position between and radially spaced from the passage peripheries 38a and 41a. Concentric concave inner and convex outer peripheries 61 and 62, respectively, of structure 58 extend axially from chamber endwall 28a toward the other endwall, not shown, but corresponding to the endwall 27 in FIG. 1. In view of said concave and convex peripheries of the vortex flow control structure 58 with truncated hollow dome, said structure may be concisely referred to in a substantially fully descriptive manner as a concave-convex hollow dome frustum structure. Transverse axially spaced sections of these peripheries progressively diminish in perimeter as a positive or direct function of their respective distance from the one endwall 28a. Part of the air vortex flowing upwardly from the annular passage 31a passes through the flow control structure 58 while in contact with the radially inwardly facing periphery 61, while another part of such vortex flows upwardly in contact with the radially outwardly facing periphery 62 because of the Coanda effect described above. Thus each of these peripheries of the vortex control means 58 conduce convergence of a portion of the vortex radially toward the axis 26a, the inwardly facing periphery 61 doing so by deflection and the outwardly facing periphery 62 doing so by inductionor Coanda effect. This vortex flow control produces upward air pressure at the center of the chamber portion 33a with somewhat the same effect as the cone-like vortex flow control means 43 as described above.

Figure 3:
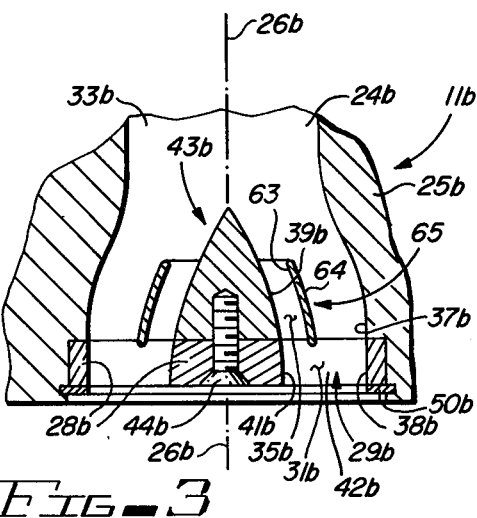
FIG. 3 is a fragmentary sectional view taken of a third form of improved precombustion chamber structure.

The third form or species of this improvement is illustrated in FIG. 3 where the parts corresponding to those of FIG. 1, 1a and 1b are designated by the same respective reference characters plus the suffix letter "b". Cone-like or dome shape periphery 39b of vestibule duct 35b is concentric with concave inner and and convex outer peripheries 63 and 64 of a concavo-convex hollow dome frustum structure 65 similar to that described above with reference to the FIG. 2 embodiment and which constitutes vortex flow control means supplementary to such means 43b. Said structure 65, which surrounds axis 26b and is spaced radially from and between the cone-like periphery 39b and the chamber sidewall 25b is secured contiguously with the endwall 28b by welding to vanes 42b. Peripheries 39b, 63 and 64 conduce convergence of portions of the air vortex in annular duct 35b radially toward axis 26b, the inwardly facing periphery 63 doing so by deflection of the air passing in contact therewith and the outwardly facing peripheries 39b and 64 doing so by induction of the air passing in contact therewith. Thus directing part of the vortex of air or air-fuel mixture toward the radial center of the combustion chamber upper portion 33b has an effect corresponding to that described above with reference to FIG. 1, namely, opposing reflux downward flow within the rotating air-fuel mass in the chamber upper portion 33b.

Figure 4:
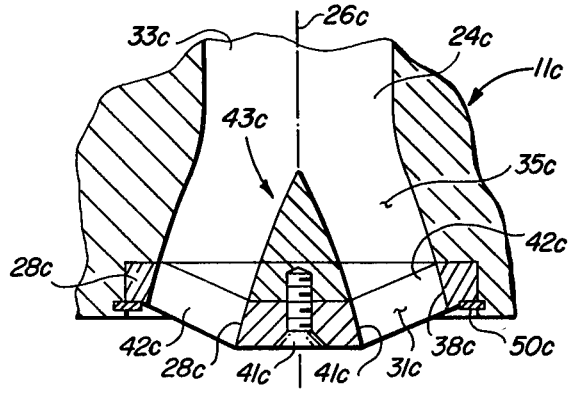
FIG. 4 is a fragmentary sectional view taken of a fourth form of the improved precombustion chamber structure.

FIG. 4 illustrates an improvement species differing from FIG. 1 species principally in the attitude of the outer and inner peripheries 38c and 41c of the endwall annular passage 31c. All parts of the FIG. 4 species corresponding to parts of the FIG. 1 species are identified by the same respective reference characters plus the suffix letter "c". That part of the chamber inner periphery facing radially inwardly opposite the vortex flow control means 43c is tapered upwardly in the direction of the principal chamber portion 24c to complement the radially outwardly-facing periphery of said means 43c in establishing the duct 35c in an attitude of radial convergence upwardly toward the chamber axis and in the direction of the principal chamber portion. Peripheries 38c aand 41c both converge axially upwardly resulting in a straighter flow course for the air or air-fuel mixture from the variable voume space into the upperchamber portion 33c and likewise reverse flow of the products of combustion from the chamber 24c into the variable volume space, resulting in less frictional heat loss from the gases traversing duct 35c and less mechanical power to force these gases through said duct. The crown of piston 13, FIG. 1, will require a recess to receive the downwardly projecting center portion of chamber structure endwall 28c.

Figure 5:
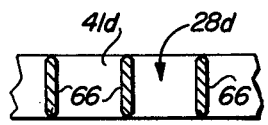
FIG. 5 is a fragmentary panoramic view taken similarly to FIG. 1b of a modified chamber endwall in which the air deflecting vanes are replaced by non-air-deflecting radially-projecting ribs.

FIG. 5 illustrates a modified form of combustion chamber endwall 28d substitutable for the corresponding endwall 28 of FIG. 1 and of the corresponding endwalls in the FIGS. 2, 3 and 4 embodiments. Since the structure of this modified form differs from the jest-mentioned endwalls only in the respect of converting the tilted air deflecting vanes to ribs 66 extending radially of such endwall and occupying respective planes common with the principal axis of such endwall as axis 26 in FIG. 1, the structure of this endwall appears clearly illustrated by the single fragmentary view corresponding to FIG. 1b. The ribs 66 permit passage of air into an associated chamber as 24, FIG. 1, without imparting helical motion to such air and therefore without creating an air vortex in the annular duct 35 and about the chamber axis 26 in the upper chamber portion 33. The transverse area of vestible duct 35 is sufficiently restricted that a simple no-vortex air stream moving upwardly therein from the variable volume space pursuant to the piston compression stroke will be concentrated and moving at sufficient speed to prevent reflux of any part of an air-fuel mass in the chamber portion 33 penetrating into the duct. Therefore, with this arrangement, at part load, an air-fuel mass in the upper chamber portion can be maintained discrete from a fuel-free air mass in the vestibule portion of the combustion chamber and thus obtain some of the advantage of this invention.

I claim:

1. A precombustion chamber structure for an internal combustion engine cylinder having a variable volume space in which air is compressed during the compression stroke of a piston therein, said chamber structure having enclosing the chamber thereof a sidewall with an inner periphery surrounding and facing radially inwardly relatively to having a principal axis of the chamber and having opposite endwalls spaced apart axially of said axis and of the chamber, the chamber structure also including in one of the endwalls a passage means having a passage annular in transverse section surrounding said axis and communicating between the variable volume space and the interior of the chamber and operable to conduct air therethrough from said space into the chamber pursuant to the compression stroke of the piston, said annular passage having an outer periphery facing radially inwardly that constitutes an unbroken continuation of the sidewall inwardly facing periphery, said passage means and chamber sidewall being configured to create a vortex of said conducted air encircling said axis within the chamber adjacently to the one endwall, and vortex flow control means disposed contiguously with said one endwall but projecting axially inwardly of the chamber relatively to said passage means and spaced from said sidewall radially inwardly therefrom toward said axis, and said flow control means being configured to conduce contractive convergence of a portion of said vortex radially toward said axis.

2. A precombustion chamber structure for an internal combustion engine cylinder having a variable volume space in which air is compressed during the compression stroke of a piston therein, said structure having enclosing the chamber thereof a chamber sidewall having a radially inwardly facing periphery surrounding a principal axis of the chamber, said chamber including a principal portion and an axially ajdacent vestibule portion comprising an elongated duct annular in transverse section surrounding said axis and communicating at an inner end thereof with the principal chamber portion and at the opposite end thereof with said space, the duct having a linear extent of at least 25 percent of the entire interior length of the chamber, said duct having an inner periphery linearly coextensive therewith facing radially outwardly and an outer periphery linearly coextensive therewith facing radially inwardly in opposed spacxed relation to such inner periphery, the inwardly facing periphery being part of said sidewall and extending said sidewall inner periphery with unbroken continuity to said opposite end of the duct, said duct being adapted to receive air from said space and to conduct at least a portion of such received air into the principal chamber portion pursuant to the compression stroke of the pistion, and transverse sections of the duct inner periphery progressively diminishing in perimeter as a positive function of their distance from said space.

3. A precombustion chamber structure having a cuplike chamber with an axis extending longitudinally therethrough and opposite ends of which one is closed and the other open to accommodate flow of air into the chamber from the exterior thereof, said structure comprising a principal chamber portion adjacently to said closed end and a chamber sidewall extending between said chamber ends the chamber sidewall having a periphery surrounding and facing inwardly toward the chamber axis and of which periphery a portion circumscribes the principal chamber portion, and air flow control means disposed within the chamber adjacently to the open end thereof and having an air flow control periphery facing radially outwardly in opposed spaced relation with a duct portion of the inwardly facing sidewall periphery to form therewith chamber as part of the chamber an elongated duct annular in transverse section communicating, through the open end, between said principal chamber portion and said exterior, said duct having a length axially of the chamber of at least 25 percent of the entire interior axial length of the chamber and having a volumetric capacity of at least 25 percent of the entire chamber, at least a portion of said air flow control periphery adjacently to said principal chamber portion being tapered axially in the direction of such chamber portion, and the circumference of said duct portion of the sidewall periphery exceeding that circumscribing the principal chamber portion.

4. A precombustion chamber structure for an internal combustion engine cylinder having a variable volume space in which air is compressed during the compression stroke of a piston therein, said structure having enclosing the chamber thereof a chamber sidewall surrounding a principal axis thereof and of the chamber, said chamber including a principal portion and an axially adjacent vestibule portion comprising an elongated duct annular in transverse section surrounding said axis and communicating at an end thereof with the principal chamber portion, said duct having an iner periphery facing radially outwardly and an outer periphery facing radially inwardly in opposed spaced relation to such inner periphery, the inwardly facing periphery being part of said sidewall, said duct extending endwise from the principal chamber portion into communication with said space and thus being adapted to receive air therefrom and to conduct at least a portion of such received air into the principal chamber portion pursuant to the compression stroke of the piston, the chamber principal portion having a radially inwardly facing periphery as part of said sidewall and in end-to-end relation with said inwardly facing periphery of the vestibule annular duct, transverse sections of the duct inwardly facing periphery adjacently to said space exceeding in perimeter at least part of the perimeter of the transverse-section periphery of the principal chamber portion, the transverse sections of the duct inwardly facing periphery progressively diminishing in perimeter as a direct function of their distance from said space until such duct section periphery perimeter equals the perimeter of the transverse-section inwardly facing periphery of the principal chamber portion where such peripheries meet in said end-to-end relation, the duct inner periphery being dome-like in shape with its base adjacently to said space, and the transverse sections of such inner periphery progressively diminishing in perimeter as a direct function of their distance from said space.

5. A precombustion chamber structure as set out in claim 1, wherein the vortex flow control means comprises at least a portion of a cone-like periphery surrounding said axis and extending axially toward the other endwall, and the axially spaced transverse sections of such periphery progressively diminishing in perimeter as a positive function of their respective distance from the one endwall.

6. A precombustion chamber structure as set out in claim 1, wherein the annular passage has an inner periphery facing radially outwardly and an outer periphery facing radially inwardly in opposed spaced relation to such inner periphery, wherein the vortex flow control means comprises a concavo-convex hollow donme frustum structure surrounding said axis with the base of said structure contiguous to the one endwall and in axial registry with a line surrounding said axis and disposed between and radially spaced from said peripheries.

7. A precombustion chamber structure as set out in claim 1, wherein said passage has respective radially inner and outer peripheries spaced radially apart, wherein the vortex flow control means comprises at least a portion of a cone-like periphery surrounding said axis in radially spaced and opposed relation with the chamber sidewall and of which periphery the base perimeter is contiguous to the one endwall and congruent with a transverse section of the passage inner periphery, wherein the vortex flow control means also comprises a concavo-convex hollow dome frustum structure surrounding said axis and spaced radially from and between said cone-like periphery and the chamber sidewall, and with the base of such structure contiguous with the one endwall.

8. A precombustion chamber structure as set out in claim 1, wherein the vortex flow control means comprises a structure providing concentric concave-convex peripheries surrounding said axis and spaced from one another radially of said axis and spaced radially inwardly from the chamber sidewall, the base of said peripheries being contiguous with the one endwall and said peripheries extending from their base axially toward the other endwall, and axially-spaced transverse sections of said peripheries progressively diminishing in circumference as a positive function of their respective distance from the one endwall.

9. A precombustion chamber structure as set out in claim 2, wherein the annular duct contains air deflecting means cooperable with the peripheries of such duct to impart helical motion about said axis to the air received by and while in such duct.

10. A precombustion chamber structure as set out in claim 2, wherein there is means interposed between said space and at least a portion of the annular duct and cooperable with the duct peripheries to impart axial helical motion about said axis to the air received by and while in said duct an axial.

11. A precombustion chamber structure as set out in claim 2, wherein there is disposed within a transverse section of said annular duct contiguous with said space a plurality of air deflecting vanes spaced apart circumferentially of said axis and angularly tilted in the same direction helically thereabout.

12. A precombustion chamber structure as set out in claim 4, wherein the annular duct contains air deflecting means cooperable with the peripheries of such duct to impart to the air received thereby and while in such duct a helical motion about said axis.

13. A precombustion chamber structure as set out in claim 4, wherein there is means interposed between said space and at least a portion of the annular duct and cooperable with the duct peripheries to impart to the air received thereby and while in said duct an axial helical motion about said axis.

14. A precombustion chamber structure as set out in claim 4, wherein there is disposed within a transverse section of said annular duct contiguous with said space a plurality of air deflecting vanes spaced apart circumferentially of said axis and angularly tilted in the same direction helically thereabout.

15. A precombustion chamber structure as set out in claim 3, wherein at least a portion of said sidewall inwardly facing duct periphery portion adjacently to said principal chamber portion is also tapered axially in the direction of said chamber portion to complement the air flow control periphery in establishing said duct in an attitude of radial convergence in the direction of said principal chamber portion.

* * * * *